(12) United States Patent
Bouchez et al.

(10) Patent No.: US 8,614,562 B2
(45) Date of Patent: Dec. 24, 2013

(54) METHOD FOR CONTROLLING SWITCHES OF SWITCHING ARMS, IN PARTICULAR IN VIEW OF CHARGING ACCUMULATION MEANS, AND CORRESPONDING CHARGING DEVICE

(75) Inventors: Boris Bouchez, Cergy le Haut (FR); Luis De Sousa, Eragny sur Seine (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 329 days.

(21) Appl. No.: 13/166,305

(22) Filed: Jun. 22, 2011

(65) Prior Publication Data

US 2011/0316481 A1  Dec. 29, 2011

(30) Foreign Application Priority Data

Jun. 25, 2010  (FR) ...................................... 1055099

(51) Int. Cl.
*H01M 10/44* (2006.01)

(52) U.S. Cl.
USPC ........................................................ 320/109

(58) Field of Classification Search
USPC ......... 320/104, 107, 109, 116, 117, 127, 139, 320/141
See application file for complete search history.

(56) References Cited

U.S. PATENT DOCUMENTS

| 6,426,597 | B2 * | 7/2002 | Rast et al. | 315/219 |
| 7,995,338 | B2 * | 8/2011 | Lu | 361/679.58 |
| 2013/0002201 | A1 * | 1/2013 | Bodkin et al. | 320/118 |

FOREIGN PATENT DOCUMENTS

FR  2 938 711 A1  5/2010

OTHER PUBLICATIONS

French Search Report issued in the corresponding French application No. 1055099, mailing date Apr. 14, 2011 (2 pages).
Lu B et al.: "Bridgeless PFC Implementation Using One Cycle Control Technique", Applied Power Electronics Conference and Exposition, 2005. APEC 2005. Twentieth Annual IEEE Austin, TX, USA, vol. 2, Mar. 6, 2005 (pp. 812-817).

\* cited by examiner

*Primary Examiner* — Edward Tso
(74) *Attorney, Agent, or Firm* — Osha Liang LLP

(57) ABSTRACT

A method for charging accumulation means configured by an electric charging device is disclosed. The charging device includes switching arms respectively including a first switch and a second switch. The method involves ordering a predetermined number of first switches to close respectively for an associated closure time, and on each opening of a first switch that was previously closed, another first switch is ordered to close for an associated closure time, so that a constant number of first switches are closed at a same time.

15 Claims, 2 Drawing Sheets

Figure 1:
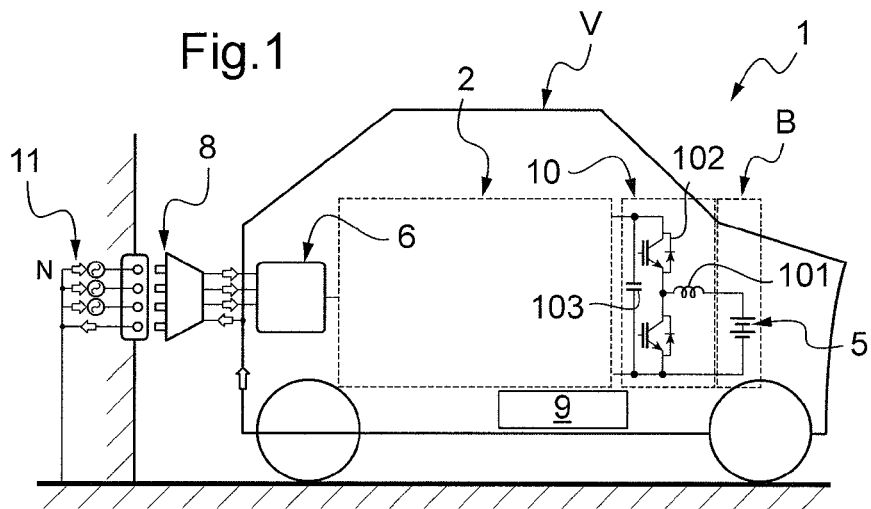

METHOD FOR CONTROLLING SWITCHES OF SWITCHING ARMS, IN PARTICULAR IN VIEW OF CHARGING ACCUMULATION MEANS, AND CORRESPONDING CHARGING DEVICE

The present invention relates to controlling switches of switching arms and applies notably to the field of motors or alternators powered by rechargeable batteries. The invention is advantageously applicable in the field of electric motor vehicles in which the batteries can power the motor via an inverter and be recharged when the motor vehicle is stopped.

However, although particularly designed for such an application, the device and the associated method can be used in other fields and notably in energy generation devices of wind turbine or hydraulic type.

Conventionally, an electric vehicle is equipped with high-voltage batteries delivering a direct current to an inverter which transforms this direct current into an alternating current that can be used to power an electric motor, the latter causing the vehicle to move.

In order for these high-voltage batteries to be recharged, it is known to equip the vehicle with a charging device incorporated in the electric vehicle comprising a power controlling converter with no diode bridge, also known by the name of "Bridgeless PFC".

Common-mode currents generated by the switching of the converter circulate in the stray capacitances exhibited by the electronics relative to the chassis, or the motor relative to the chassis or even the battery relative to the chassis. These currents are looped back via the chassis, the earth wire linked to the neutral of the electricity network. The charger therefore emits disturbances on the electricity network. Standards limit the emission of high-frequency disturbances on the electricity network.

Passive filtering solutions may help to resolve the problem. This involves, for example, placing a common-mode filter on the input of the charger. Thus, the common-mode currents are looped back via the filter instead of going through the network. Nevertheless, the drawback of the filters, apart from the cost and the volume, is that they will generate low-frequency leakage currents (of the order of 50 Hz/60 Hz) between the mains and the earth.

Exemplary embodiments of the invention therefore aim at limiting the generation of common-mode currents by preventing the stray capacitances from being excited by voltage variations.

To this end, exemplary embodiments of the invention provide a method for controlling switches of switching arms, each switching arm comprising respectively a first and a second switch, the method comprising the following steps:
  a) a predetermined number of first switches are ordered to close respectively for an associated closure time, and
  b) on each opening of a first switch that was previously closed, another first switch is ordered to close for an associated closure time, so that a constant number of first switches are closed at the same time.

Other exemplary embodiments of the invention provide a method for charging accumulation means via an electric charging device comprising switching arms respectively comprising a first switch and a second switch, characterized in that it comprises the steps a) and b) of the above-mentioned controlling method, steps according to which:
  a) a predetermined number of first switches are ordered to close respectively for an associated closure time, and
  b) on each opening of a first switch that was previously closed, another first switch is ordered to close for an associated closure time, so that a constant number of first switches are closed at the same time.

The fact that there is a constant number of switches of one and the same level on the switching arms that are closed at the same time, notably when charging the accumulation means, makes it possible to impose a neutral voltage which is constant. The voltage variations likely to excite the stray capacitances, and therefore the common-mode currents, are thus reduced.

The first switches may all have the same position compared with the second switches. The first switches are for example on the top of the switching arms while the second switches are on the bottom of the switching arms.

Said controlling or charging method may also comprise one or more of the following characteristics, alone or in combination:
  said first switches are ordered to close by transmission of pulse width modulation PWM control signals,
  the control signals are in phase,
  the control signals are phase-shifted,
  said charging device is three-phase and the average modulation of the phases of said charging device is equal to $\frac{1}{3}$,
  the ratio between the number of first switches closed at the same time and the total number of first and second switches closed at the same time is equal to $\frac{1}{3}$. Other exemplary embodiments of the invention also provide a corresponding charging device for implementing the controlling or charging method as defined above. This electric charging device for charging accumulation means comprises:
  switching arms respectively comprising a first and a second switch, and
  a control device for controlling said switches, configured to order the closure of a predetermined number of first switches respectively for an associated closure time, and to order, on each opening of a first switch that was previously closed, the closure of another first switch for an associated closure time, so that a constant number of first switches are closed at the same time, during the charging of the accumulation means.

Said charging device may also comprise one or more of the following characteristics, alone or in combination:
  said device comprises three switching arms,
  said device comprises three H-configuration bridge structures respectively formed by two switching arms,
  the switches respectively comprise a transistor and a reverse diode,
  said device comprises an inverter comprising said switching arms,
  said device comprises a DC/DC converter between the inverter and the accumulation means,
  said device comprises a three-phase alternating current motor,
  the control device is configured to control the switches so as to switch from a power supply mode for powering said motor to a charging mode for charging the accumulation means, and vice versa.

The charging device may comprise inductances, the latter being, where appropriate, formed by the windings of the phases of an electric motor. In the case of a three-phase motor, three inductances may thus be formed by the windings of the motor.

A connector system enabling connection to an electricity network may be incorporated in the device.

Figure 2:
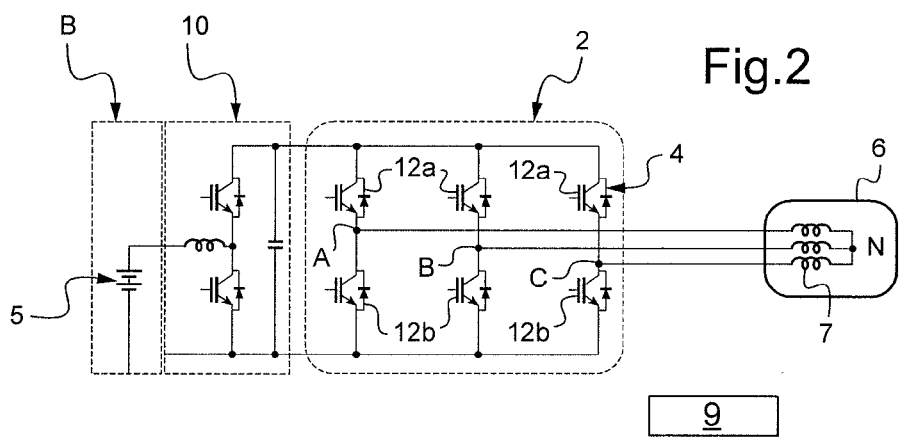
Figure 3:
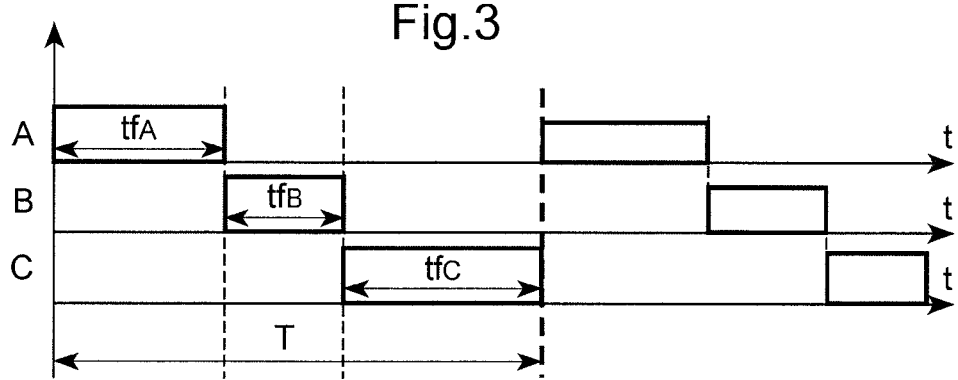
Figure 4:
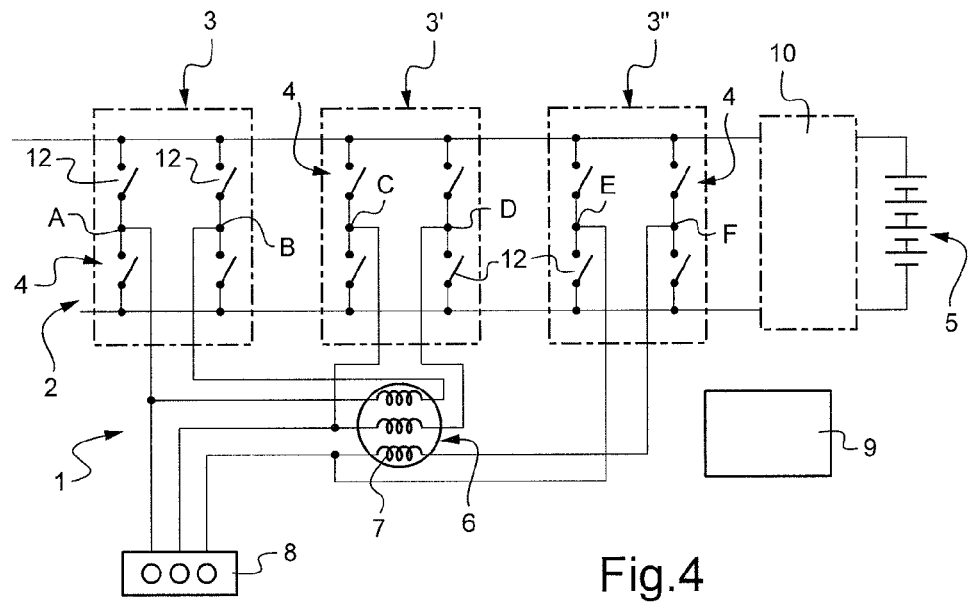
Figure 5:
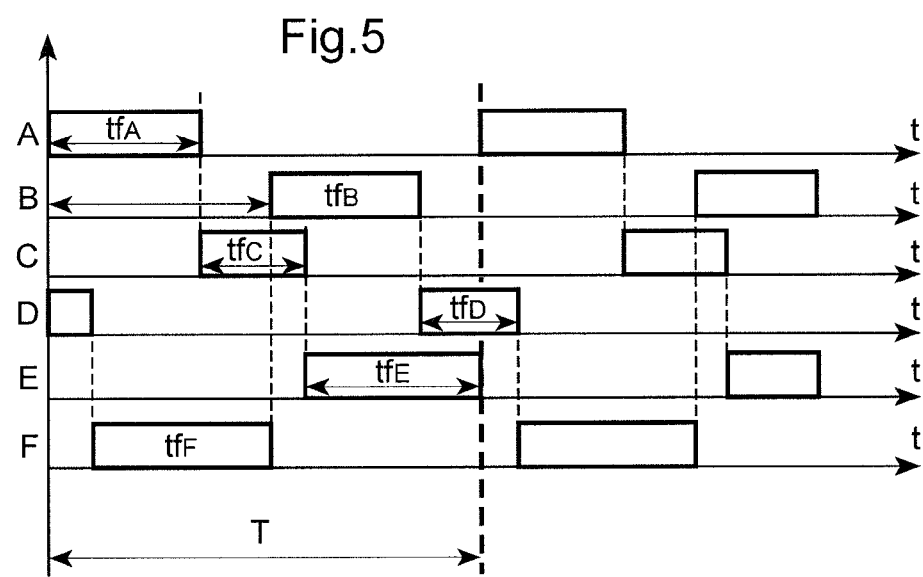

Other features and advantages of the invention will emerge from the following description, given as a nonlimiting example, in light of the appended drawings in which:

FIG. 1 schematically represents a three-phase charging device with a three-phase electricity network for a motor vehicle, FIG. 2 represents, in a simplified manner, a part of the charging device according to a first embodiment, FIG. 3 illustrates a timing diagram representing the control signals of the device of FIG. 2 in the charging method according to the invention, FIG. 4 represents, in a schematic and simplified manner, a second embodiment of the charging device, FIG. 5 illustrates a timing diagram representing the control signals of the device of FIG. 4 in the charging method.

In these figures, and hereinafter in the description, elements that are substantially the same are identified by the same reference numbers.

FIRST EMBODIMENT

Inverter with Three Switching Arms

Device

Referring to FIGS. 1 and 2, an exemplary embodiment of a device 1 for charging a motor vehicle V, for example hybrid or electric, with switching means 4 comprising three switching arms A, B, C and inductances 7, can be seen schematically represented. This device 1 makes it possible to recharge accumulation means 5 forming a battery B of the vehicle V.

Each switching arm A, B, C comprises in the example described two switches 12a, 12b distributed on the arms A to C; a first switch 12a on the top of the switching arm relative to FIG. 2 and a second switch 12b on the bottom of the switching arm.

Provision can be made for these switching means 4 to be incorporated in an inverter 2 of the device 1.

Provision can also be made for the inductances 7 to be formed by the windings of an alternating current three-phase motor 6, partially represented. In this case, the switching arms are linked by their mid-points to the phases of the motor 6.

The device 1 also comprises in the example shown in FIGS. 1 and 2 a connector system 8 enabling connection to the outlet of a three-phase electricity network 11. This connector system may comprise locking means, not represented in the appended figures, making it possible to prevent access to the electricity outlet when the device 1 is powered up. The connector system 8 may also be associated with second locking means (not represented) preventing the user from accessing the conductors (which are then live) during the power supply mode.

The charging device 1 may then charge the battery B from the electricity network 11 linked to the earth, by employing the inductances 7.

The charging device 1 also comprises, in the embodiment shown, a control circuit 9 for driving the switches 12a, 12b. In the figures, the link between the control circuit 9 and the switches 12a,12b is not represented to make it easier to understand the figures.

The device 1 may also comprise a DC/DC converter 10 positioned between the inverter 2 and the accumulation means 5. The use of a DC/DC converter 10 makes it possible to adapt the voltages and consequently optimize the dimensioning of the inverter without degrading efficiency. In fact, the voltage of the accumulation means 5 varies with their charges, the variations ranging from singular to double, the use of a DC/DC converter 10 makes it possible to dimension the inverter 2 for a lower voltage, the latter having to allow half as much current to pass.

As an example, this converter 10 comprises an inductance 101 connected to the accumulation means 5, two switches 102 whose mid-point is linked to the inductance 101, and a capacitor 103 connected to the terminals of the two switches 102.

Operation

In charging mode, in which the device 1 charges the battery B from the electricity network 11 linked to the earth, by employing the inductances 7, the control circuit 9 drives the arms A to C so that there is, at any instant, a constant number n of switches on one and the same level closed at the same time, for example the first switches 12a on the top. Obviously, it would be possible to choose the second switches 12b on the bottom.

By also referring to FIG. 3, in the method for charging the battery B, for example over a given period T:

the first switch 12a of the first arm A is ordered to close for a closure time $tf_A$, when the closure time $tf_A$ of the first switch 12a of the first arm A is completed, and this first switch 12a opens, the first switch 12a of the second arm B is ordered to close for a closure time $tf_B$, and when the closure time $tf_B$ of the first switch 12a of the second arm B is completed and this first switch 12a opens, the first switch 12a of the third arm C is ordered to close for a closure time $tf_C$.

Thus, the time intervals over which the switches 12a are closed are distinct. This synchronization makes it possible to have one switch 12a closed at a time over the period T. There is no overlapping of the control signals. A constant voltage is thus ensured at the neutral N of the network 11.

In this example, the constant number $\overline{n}$ of first switches 12a that have to be closed at the same time is equal to 1. This number is calculated on the basis of the average modulation as detailed below.

Each arm A to C is modulated with a pulse width modulation technique, called PWM. As specified previously, these arms A to C are modulated so as to generate a sinusoidal current in each phase. In the case of a three-phase charging device, each phase is phase-shifted by $2\pi/3$ and the modulation depths m are equal. The modulations of each phase are therefore calculated according to the following equations (1):

$$\begin{cases} m_a(t) = k + m * \cos(wt) \\ m_b(t) = k + m * \cos\left(wt - \dfrac{2\pi}{3}\right) \\ m_c(t) = k + m * \cos\left(wt - \dfrac{4\pi}{3}\right) \end{cases} \quad (1)$$

(with k being the average modulation, and $m_a(t)$, $m_b(t)$ and $m_c(t)$ the modulation of each phase a, b, c.)

The sum of the modulations $\underline{m_x}$ is therefore equal to 3 k and, so as not to have any overlap, it is essential for the sum of the modulations to be equal to 1, so consequently the average modulation $\underline{k}$ must be equal to ⅓ (see relationship (2)):

$$\sum m_x = 3k < 1 \Longrightarrow k = \dfrac{1}{3} \quad (2)$$

Consequently, the ratio between the number of first switches 12a and the total number of switches 12a,12b that are closed at the same time is ⅓.

According to this first embodiment, there are three switching arms A, B, C and six switches 12a,12b distributed on these three arms A to C. Consequently, when three switches 12a, 12b are closed, three other switches 12a,12b are open. Of the three switches that are closed, ⅓ must be a first switch 12a on the top of the switching arms, the other two switches that are closed are second switches 12b on the bottom of the switching arms.

There is therefore a constant number n of a first switch 12a that is closed (relationship (3)):

$$n=1 \qquad (3)$$

Obviously, the three-phase charging device 1 described above can be generalized to a polyphase system.

Furthermore, in the particular case where the switching means 4 are incorporated in the inverter 2, the device 1 is designed to operate, in addition to the charging mode in which it charges the battery B from the electricity network 11 linked to the earth, by employing the windings 7 of the motor 6 as inductance, according to a power supply mode in which it provides the alternating current power supply for the motor 6, from the battery B.

The switchover from the power supply mode to the charging mode is then managed by the control circuit 9.

In power supply mode, the control circuit 9 drives the arms A to C so as to allow for the circulation of an alternating current in the corresponding phase of the motor 6.

The alternating currents circulating in the three phases of the motor are conventionally coordinated for the motor to revolve. The switches 12a,12b, which are, in the present example, power transistors with a reverse-mounted diode, can be driven according to a conventional sinusoidal PWM (pulse width modulation) command.

In charging mode, the control circuit 9 drives the arms A to C as described previously.

SECOND EMBODIMENT

Inverter with Six Switching Arms

Device

Referring now to FIGS. 1 and 4, a second embodiment is described according to which the device 1 has six switching arms forming three H-configuration bridges 3,3',3" which are, for example, incorporated in the inverter 2.

The switching means 4 therefore comprise six switching arms A, B, C, D, E, F.

Each switching arm A, B, C, D, E, F comprises two switches 12a,12b distributed on the six arms A to F; as previously, a first switch 12a on the top of the switching arm relative to FIG. 4 and a second switch 12b on the bottom of the switching arm.

One advantage of the H-configuration bridge compared to the conventional three-phase bridge is that its use doubles the voltage applied to the phases of the motor 6 for one and the same voltage, so that, although it comprises double the number of switches 12a,12b, the silicon surface area used will be the same for the H-configuration bridge as that for the conventional three-phase bridge; this is because, in fact, the phase currents are divided by two.

The use of the H-configuration bridges also makes it possible to reduce the losses due to the switching actions.

According to this second embodiment, there are six switching arms A, B, C, therefore twelve switches 12a,12b. When six switches 12a,12b are closed, six other switches 12a,12b are open. Of the six switches that are closed, ⅓ must be first switches 12a on the top of the switching arms.

There is therefore a constant number n of two first switches 12a that are closed out of six switches that are closed overall, the other four switches that are closed are therefore second switches 12b on the bottom of the switching arms (relationship (4)):

$$n=2. \qquad (4)$$

Operation

Referring also to FIG. 5, in the method for charging the battery B, for example:

on the one hand, the first switch 12a of the first arm A is ordered to close for a closure time $tf_A$, and on the other hand, the first switch 12a of the fourth arm D is ordered to close for a closure time $tf_D$.

The control signals for the switching arms A and D may be phase-shifted as in the example illustrated, or, according to an alternative, these control signals may be in phase.

When the closure time $tf_A$ of the first switch 12a of the first arm A is completed and this first switch 12a opens, the first switch 12a of the third arm C is ordered to close for a closure time $tf_C$. Then, when the closure time $tf_C$ of the first switch 12a of the third arm C is completed and this first switch 12a opens, the first switch 12a of the fifth arm E is ordered to close for a closure time $tf_E$.

Similarly, when the closure time $tf_E$ of the first switch 12a of the fourth arm D is completed and this first switch 12a opens, the first switch 12a of the sixth arm F is ordered to close for a closure time $tf_F$. Then, when the closure time $tf_F$ of the first switch 12a of the sixth arm C is completed and this first switch 12a opens, the first switch 12a of the second arm B is ordered to close for a closure time $tf_B$.

As previously, this synchronization makes it possible to have two switches 12 closed at the same time. A constant voltage is thus assured at the neutral N of the network 11.

In conclusion, with a charging device 1 as described previously, a constant voltage is maintained at the level of the neutral N of the network 11, so as to reduce the common-mode currents which may be induced, even in the case of imperfect synchronization of the pulse edges.

The invention is not limited to the above-described exemplary embodiments and may notably be implemented regardless accumulation means of an electric vehicle are charged. The invention broadly aims at controlling the switches of switching arms to reduce common-mode currents.

The invention claimed is:

1. A method for controlling switches of switching arms, each switching arm comprising respectively a first and a second switch, the method comprising:

ordering a predetermined number of first switches to close respectively for an associated closure time; and on each opening of a first switch that was previously closed, ordering another first switch to close for an associated closure time, so that a constant number of first switches are closed at a same time.

2. A method for charging accumulation means via an electric charging device, comprising switching arms respectively comprising a first switch and a second switch, the method comprising:

ordering a predetermined number of first switches to close respectively for an associated closure time; and on each opening of a first switch that was previously closed, ordering another first switch to close for an associated closure time, so that a constant number of first switches are closed at the same time.

3. The method according to claim 1, said first switches being ordered to close by transmission of pulse width modulation PWM control signals.

4. The method according to claim 3, the control signals being in phase.

5. The method according to claim 3, the control signals being phase-shifted.

6. The method according to claim 2, the charging device being three-phase and the average modulation of the phases of the charging device being equal to ⅓.

7. The method according to claim 6, wherein a ratio of the number of first switches closed at the same time and a total number of first and second switches closed at the same time is equal to ⅓.

8. An electric charging device for charging accumulation means, said electric device comprising:
    switching arms respectively comprising a first and a second switch; and
    a control device for controlling said switches,
    wherein, during the charging of the accumulation means, the control device is configured to:
    order the closure of a predetermined number of first switches respectively for an associated closure time, and
    order, on each opening of a first switch that was previously closed, the closure of another first switch for an associated closure time, so that a constant number of first switches are closed at a same time.

9. The electric device according to claim 8, further comprising three switching arms.

10. The electric device according to claim 8, further comprising three H-configuration bridge structures respectively formed by two switching arms.

11. The electric device according to claim 8, the switches respectively comprising a transistor and a reverse diode.

12. The electric device according to claim 8, further comprising an inverter comprising said switching arms.

13. The electric device according to claim 12, further comprising a DC/DC converter between the inverter and the accumulation means.

14. The electric device according to claim 8, further comprising a three-phase alternating current motor.

15. The electric device according to claim 14, the control device being configured to control the switches to switch from a power supply mode for powering said motor to a charging mode for charging the accumulation means, and vice versa.

* * * * *